US012735068B2

(12) United States Patent
O'Dea et al.

(10) Patent No.: US 12,735,068 B2
(45) Date of Patent: Sep. 15, 2026

(54) INTELLIGENT MOTOR TORQUE CONTROL

(71) Applicant: GM Global Technology Operations LLC, Detroit, MI (US)

(72) Inventors: Kevin A. O'Dea, Ann Arbor, MI (US); Chase Goodin, Howell, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 18 days.

(21) Appl. No.: 19/050,670

(22) Filed: Feb. 11, 2025

(65) Prior Publication Data

US 2026/0233758 A1 Aug. 13, 2026

(51) Int. Cl.
*B60W 60/00* (2020.01)
*B60L 15/20* (2006.01)
*B60W 50/06* (2006.01)

(52) U.S. Cl.
CPC ......... *B60W 60/0025* (2020.02); *B60L 15/20* (2013.01); *B60W 50/06* (2013.01); *B60L 2240/14* (2013.01); *B60L 2240/26* (2013.01); *B60L 2240/423* (2013.01); *B60W 2530/10* (2013.01); *B60W 2530/20* (2013.01); *B60W 2555/20* (2020.02)

(58) Field of Classification Search
CPC ............. B60W 60/0025; B60W 50/06; B60W 2530/10; B60W 2530/20; B60W 2555/20; B60L 15/20; B60L 2240/14; B60L 2240/26; B60L 2240/423
See application file for complete search history.

(56) References Cited

U.S. PATENT DOCUMENTS

2018/0265076 A1 9/2018 Hall et al.
2020/0007064 A1* 1/2020 Wang ........................ B60L 3/12
2023/0034858 A1* 2/2023 Gloceri ................. B60W 30/16
2023/0415748 A1* 12/2023 Itagaki .................. B60W 10/04

FOREIGN PATENT DOCUMENTS

DE 10336743 A1 3/2004
DE 102014203998 A1 9/2014
DE 102019133698 A1 7/2020
DE 102023109344 A1 10/2023
WO 2018118649 A1 6/2018
WO 2023177898 A1 9/2023

* cited by examiner

*Primary Examiner* — Anne Marie Antonucci
*Assistant Examiner* — Luis G Del Valle
(74) *Attorney, Agent, or Firm* — Vivacqua Crane, PLLC

(57) ABSTRACT

A system for controlling acceleration within an autonomous vehicle includes an autonomous vehicle controller adapted to receive an acceleration command, receive real-time data related to a radius of tires of the vehicle, presence of a trailer connected to the vehicle, and a mass of the vehicle including any trailer connected thereto, estimate the radius of the tires of the vehicle, determine if a trailer is connected to the vehicle and estimate a total weight of the vehicle, including any trailer connected thereto, based on the real-time data, calculate a motor torque command as a function of the acceleration command, the estimated radius of the tires of the vehicle and the estimated total weight of the vehicle, actuate a propulsion system of the vehicle according to the calculated motor torque command, and accelerate the vehicle according to the acceleration command.

20 Claims, 2 Drawing Sheets

INTELLIGENT MOTOR TORQUE CONTROL

INTRODUCTION

The present disclosure relates to a system for controlling acceleration in an autonomous vehicle. During autonomous driving, an acceleration command is transformed to a torque command that is sent to a propulsion system of the vehicle. In known systems, formulas for transforming an acceleration command to a torque command use constant values for vehicle mass and tire size. Vehicle mass and tire size can significantly affect the amount of torque required to achieve a desired acceleration. Current systems rely on detection of actual acceleration that does not match a desired acceleration to modify system parameters. This system latency results in noticeable speed error.

Thus, while current vehicle systems achieve their intended purpose, there is a need for a new and improved system and method of controlling acceleration in an autonomous vehicle that takes vehicle mass, presence of a trailer attached to the vehicle and radius of the tires of the vehicle into consideration when transforming an acceleration command into a torque command.

SUMMARY

According to several aspects of the present disclosure, a method of controlling acceleration within an autonomous vehicle includes, with an autonomous vehicle controller, receiving an acceleration command based on a desired acceleration of the vehicle, receiving, from a plurality of onboard sensors within the autonomous vehicle, real-time data related to a radius of tires of the vehicle, presence of a trailer connected to the vehicle, and a mass of the vehicle including any trailer connected thereto, estimating the radius of the tires of the vehicle based on the real-time data related to the radius of the tires of the vehicle, determining if a trailer is connected to the vehicle based on the real-time data related to the presence of a trailer connected to the vehicle, estimating a total weight of the vehicle, including any trailer connected thereto, based on the real-time data related to the mass of the vehicle including any trailer connected thereto, calculating a motor torque command as a function of the acceleration command, the estimated radius of the tires of the vehicle and the estimated total weight of the vehicle, actuating a propulsion system of the vehicle according to the calculated motor torque command, and accelerating the vehicle according to the acceleration command.

According to another aspect, the calculating a motor torque command as a function of the acceleration command, the estimated radius of the tires of the vehicle and the estimated total weight of the vehicle further includes accessing, with a machine learning model in communication with a database, data related to past occurrences where a motor torque command was calculated, and estimating the motor toque command for a current acceleration command, current estimated radius of the tires of the vehicle, current estimated total weight of the vehicle and current operating and environmental conditions based on prior calculated motor torque commands for substantially similar acceleration command, estimated radius of the tires of the vehicle, estimated total weight of the vehicle and operating and environmental conditions.

According to another aspect, the method further includes receiving, with the autonomous vehicle controller, from the plurality of onboard sensors, data related to an actual acceleration of the vehicle, comparing the actual acceleration of the vehicle to the desired acceleration of the vehicle, and adjusting the calculated motor torque command based on variation between the actual acceleration of the vehicle and the desired acceleration of the vehicle.

According to another aspect, the method further includes updating the machine learning model based on adjustments made to the calculated motor torque command.

According to another aspect, the estimating the radius of the tires of the vehicle based on the real-time data related to the radius of the tires of the vehicle includes, when the vehicle is an all-wheel-drive vehicle, estimating the radius of each tire of the vehicle, and calculating an average tire radius of all the tires of the vehicle.

According to another aspect, the estimating the radius of the tires of the vehicle based on the real-time data related to the radius of the tires of the vehicle includes, when the vehicle is a front-wheel-drive vehicle, estimating the radius of each front tire of the vehicle, and calculating an average tire radius of all the front tires of the vehicle.

According to another aspect, the estimating the radius of the tires of the vehicle based on the real-time data related to the radius of the tires of the vehicle includes, when the vehicle is a rear-wheel-drive vehicle, estimating the radius of each rear tire of the vehicle, and calculating an average tire radius of all the rear tires of the vehicle.

According to another aspect, the estimating the radius of the tires of the vehicle based on the real-time data related to the radius of the tires of the vehicle includes, when real-time data related to the radius of the tires of the vehicle is unavailable, one of using a pre-determined default value for the radius of the tires of the vehicle, or using a previous estimated radius of the tires of the vehicle.

According to another aspect, the estimating the total weight of the vehicle, including any trailer connected thereto, based on the real-time data related to the mass of the vehicle including any trailer connected thereto further includes, when no trailer is connected to the vehicle, estimating the total weight of the vehicle as the estimated weight of the vehicle alone.

According to another aspect, the estimating the total weight of the vehicle, including any trailer connected thereto, based on the real-time data related to the mass of the vehicle including any trailer connected thereto further includes, when a trailer is connected to the vehicle, calculating the estimated total weight of the vehicle as a function of the estimated weight of the vehicle alone and a multiplier based on the estimated weight of the vehicle alone and a speed of the vehicle.

According to another aspect, the estimating the total weight of the vehicle, including any trailer connected thereto, based on the real-time data related to the mass of the vehicle including any trailer connected thereto further includes, when real-time data related to the mass of the vehicle including any trailer connected thereto is unavailable, one of using a pre-determined default value for the total weight, or using a previous estimated total weight.

According to several aspects of the present disclosure, a system for controlling acceleration within an autonomous vehicle includes an autonomous vehicle controller adapted to receive an acceleration command based on a desired acceleration of the vehicle, receive, from a plurality of onboard sensors within the autonomous vehicle, real-time data related to a radius of tires of the vehicle, presence of a trailer connected to the vehicle, and a mass of the vehicle including any trailer connected thereto, estimate the radius of the tires of the vehicle based on the real-time data related to the radius of the tires of the vehicle, determine if a trailer is connected to the vehicle based on the real-time data related to the presence of a trailer connected to the vehicle, estimate a total weight of the vehicle, including any trailer connected thereto, based on the real-time data related to the mass of the vehicle including any trailer connected thereto, calculate a motor torque command as a function of the acceleration command, the estimated radius of the tires of the vehicle and the estimated total weight of the vehicle, actuate a propulsion system of the vehicle according to the calculated motor torque command, and accelerate the vehicle according to the acceleration command.

According to another aspect, when calculating the motor torque command as a function of the acceleration command, the estimated radius of the tires of the vehicle and the estimated total weight of the vehicle, the autonomous vehicle controller is further adapted to access, with a machine learning model in communication with a database, data related to past occurrences where a motor torque command was calculated, and estimate the motor toque command for a current acceleration command, current estimated radius of the tires of the vehicle, current estimated total weight of the vehicle and current operating and environmental conditions based on prior calculated motor torque commands for substantially similar acceleration command, estimated radius of the tires of the vehicle, estimated total weight of the vehicle and operating and environmental conditions.

According to another aspect, the autonomous vehicle controller is further adapted to receive, from the plurality of onboard sensors, data related to an actual acceleration of the vehicle, compare the actual acceleration of the vehicle to the desired acceleration of the vehicle, and adjust the calculated motor torque command based on variation between the actual acceleration of the vehicle and the desired acceleration of the vehicle.

According to another aspect, the autonomous vehicle controller is further adapted to update the machine learning model based on adjustments made to the calculated motor torque command.

According to another aspect, when estimating the radius of the tires of the vehicle based on the real-time data related to the radius of the tires of the vehicle, the autonomous vehicle controller is further adapted to, when the vehicle is an all-wheel-drive vehicle, estimate the radius of each tire of the vehicle, and calculate an average tire radius of all the tires of the vehicle, when the vehicle is a front-wheel-drive vehicle, estimate the radius of each front tire of the vehicle, and calculate an average tire radius of all the front tires of the vehicle, when the vehicle is a rear-wheel-drive vehicle, estimate the radius of each rear tire of the vehicle, and calculate an average tire radius of all the rear tires of the vehicle, and, when real-time data related to the radius of the tires of the vehicle is unavailable, one of use a pre-determined default value for the radius of the tires of the vehicle, or use a previous estimated radius of the tires of the vehicle.

According to another aspect, when estimating the total weight of the vehicle, including any trailer connected thereto, based on the real-time data related to the mass of the vehicle including any trailer connected thereto, the autonomous vehicle controller is further adapted to, when no trailer is connected to the vehicle, estimate the total weight of the vehicle as the estimated weight of the vehicle alone.

According to another aspect, when estimating the total weight of the vehicle, including any trailer connected thereto, based on the real-time data related to the mass of the vehicle including any trailer connected thereto, the autonomous vehicle controller is further adapted to, when a trailer is connected to the vehicle, calculate the estimated total weight of the vehicle as a function of the estimated weight of the vehicle alone and a multiplier based on the estimated weight of the vehicle alone and a speed of the vehicle.

According to another aspect, when estimating the total weight of the vehicle, including any trailer connected thereto, based on the real-time data related to the mass of the vehicle including any trailer connected thereto, the autonomous vehicle controller is further adapted to, when real-time data related to the mass of the vehicle including any trailer connected thereto is unavailable, one of use a pre-determined default value for the total weight, or use a previous estimated total weight.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
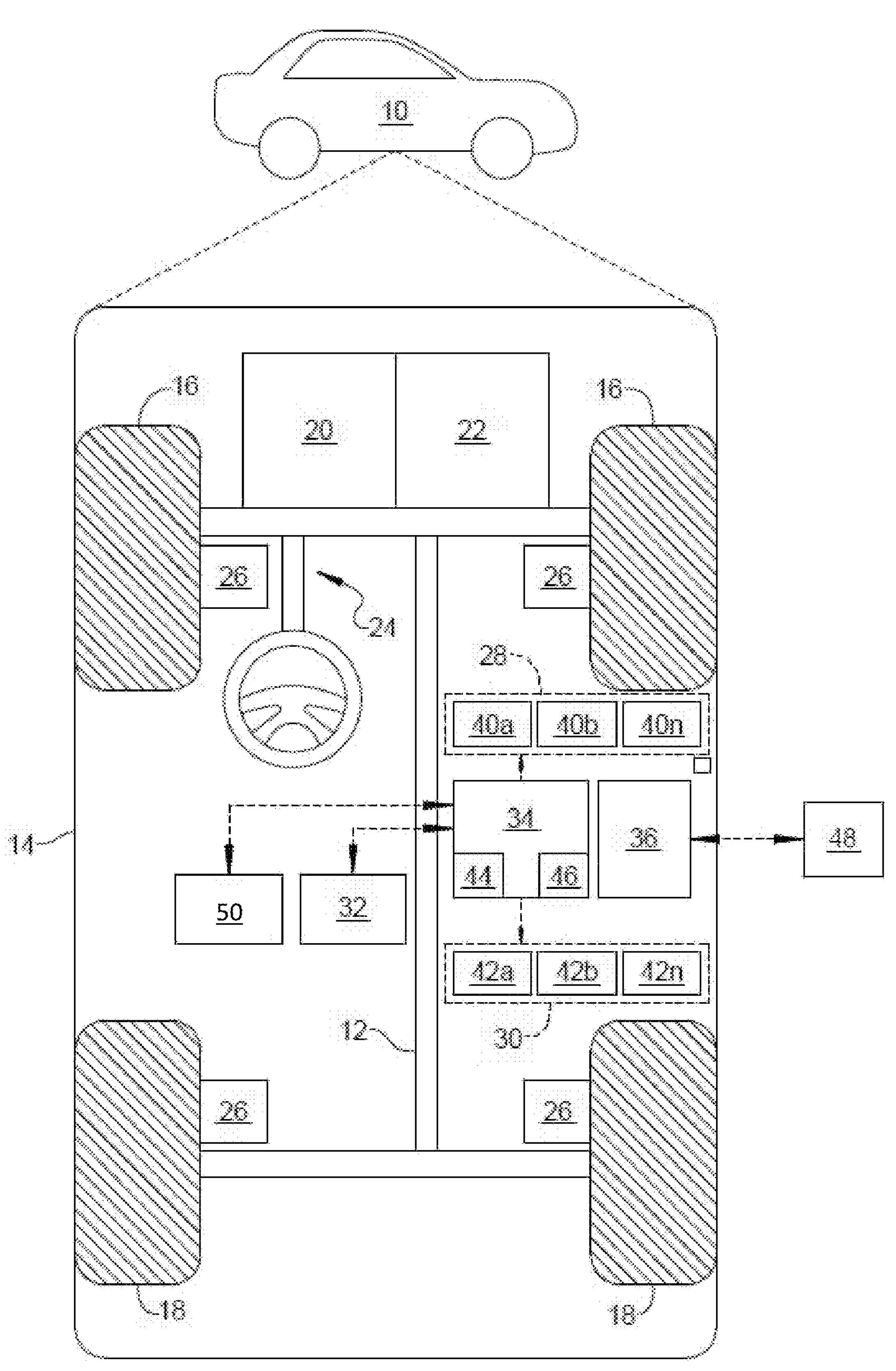
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, including autonomous or semi-autonomous vehicles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances (widths, heights, lengths), comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

In accordance with an exemplary embodiment, FIG. 1 shows an autonomous vehicle 10 with an associated system 50 for controlling acceleration of the autonomous vehicle 10. In general, the system 50 works in conjunction with other systems within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

The autonomous vehicle 10 is a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The system 50 can be utilized to provide acceleration control for the autonomous vehicle 10. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the steerable wheels (front wheels 16 and/or rear wheels 18). The steerable wheels may include only the front wheels 16, such as is most common in automotive vehicles 10, however, the steerable wheels may include both the front wheels 16 and the rear wheels 18, such as with a vehicle equipped with all-wheel steering. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more onboard sensors 40_a_-40_n_ that sense observable conditions of the exterior environment and/or the interior environment of the autonomous vehicle 10. The sensing devices 40_a_-40_n_ can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40_a_-40_n_ is used to determine information about an environment surrounding the vehicle 10. In an exemplary embodiment, the plurality of sensing devices 40_a_-40_n_ includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40_a_-40_n_ further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40_a_-40_n_ is capable of measuring distances in the environment surrounding the vehicle 10.

In a non-limiting example wherein the plurality of sensing devices 40_a_-40_n_ includes a camera, the plurality of sensing devices 40_a_-40_n_ measures distances using an image processing algorithm configured to process images from the camera and determine distances between objects. In another non-limiting example, the plurality of vehicle sensors 40_a_-40_n_ includes a stereoscopic camera having distance measurement capabilities. In one example, at least one of the plurality of sensing devices 40_a_-40_n_ is affixed inside of the vehicle 10, for example, in a headliner of the vehicle 10, having a view through the windshield of the vehicle 10. In another example, at least one of the plurality of sensing devices 40_a_-40_n_ is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42_a_-42_n_ that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
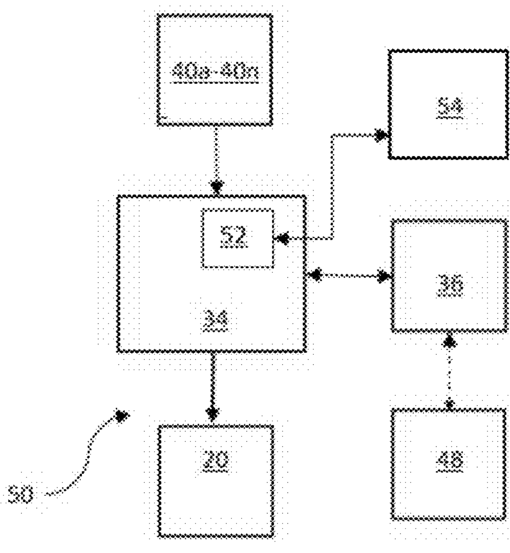
FIG. 2 is a schematic illustration of the system according to an exemplary embodiment.
Figure 3:
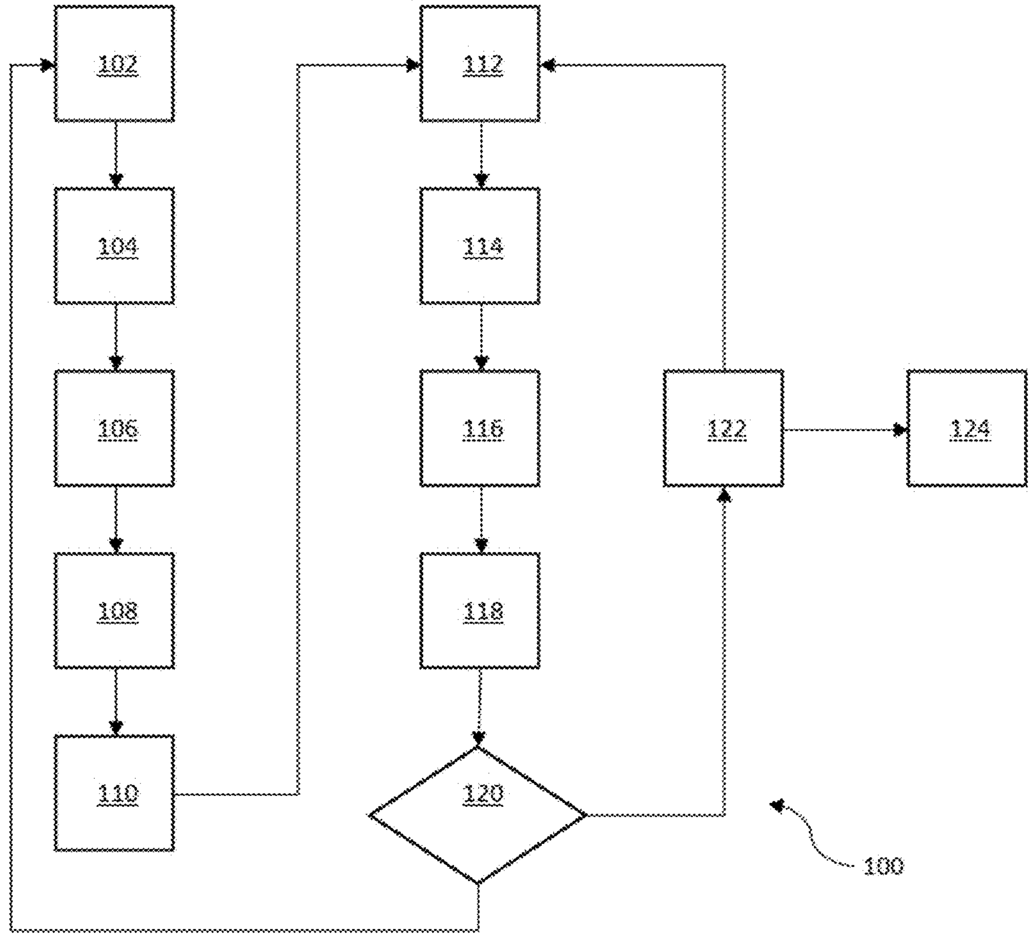
FIG. 3 is a schematic flowchart illustrating a method according to an exemplary embodiment of the present disclosure.

Referring to FIG. 2 a schematic diagram of the system 50 is shown. The system 50 includes an autonomous vehicle controller 34A, in communication with the vehicle controller 34 and in communication with the plurality of sensing devices (onboard sensors) 40*a*-40*n*. The autonomous vehicle controller 34A is adapted to control autonomous aspects of the vehicle 10. The plurality of onboard sensors 40*a*-40*n* are adapted to detect and monitor vehicle driving characteristics and the environment surrounding the vehicle 10. The autonomous vehicle controller 34A may be the vehicle controller 34, or the autonomous vehicle controller 34A may be a separate controller in communication with the vehicle controller 34.

The autonomous vehicle controller 34A is further in communication with the wireless communication module 36. The wireless communication module 36 is located within the vehicle controller 34 and is adapted to allow wireless communication between the vehicle 10 and other vehicles or other external sources. The autonomous vehicle controller 34A is adapted to collect information from databases via a wireless data communication network over wireless communication channels such as a WLAN, 4G/LTE or 5G network, or the like. Such databases can be communicated with directly via the internet, or may be cloud-based databases. Information that may be collected by the autonomous vehicle controller 34A from such external sources 48 includes, but is not limited to road and highway databases maintained by the department of transportation, a global positioning system, the internet, other vehicles via V2V communication networks, traffic information sources, vehicle-based support systems such as OnStar, etc.

The autonomous vehicle controller 34A is adapted to receive an acceleration command based on a desired acceleration of the vehicle 10. When the autonomous vehicle 10, in response to entered commands by a passenger or in response to external/environmental conditions determines that acceleration, either positive (speed-up) or negative (slow down) is appropriate, an acceleration command is generated telling the autonomous vehicle controller 34A to either increase acceleration or decrease acceleration. The autonomous vehicle controller 34A transforms an acceleration command into a torque command that is sent to the propulsion system 20 which uses the torque command to accelerate or decelerate the vehicle 10.

The autonomous vehicle controller 34A is further adapted to receive, from the plurality of onboard sensors 40*a*-40*n* within the autonomous vehicle 10, real-time data related to a radius of tires of the vehicle 10, presence of a trailer connected to the vehicle 10, and a mass of the vehicle 10 including any trailer connected thereto. The autonomous vehicle controller 34A uses real-time data collected from the plurality of onboard sensors 40*a*-40*n* to estimate the radius of the tires of the vehicle 10, determine if a trailer is connected to the vehicle 10, and estimate a total weight of the vehicle 10, including any trailer connected thereto.

The autonomous vehicle controller 34A calculates a motor torque command as a function of the acceleration command, the estimated radius of the tires of the vehicle 10 and the estimated total weight of the vehicle 10 and actuates the propulsion system 20 of the vehicle 10 according to the calculated motor torque command and accelerates the vehicle 10 according to the acceleration command. Thus, the system 50 pre-emptively determines if a trailer is present and estimates a total mass and tire size of the vehicle 10 and takes those parameters into consideration to calculate a motor torque command that will more accurately control acceleration of the vehicle 10 in accordance with the acceleration command.

In an exemplary embodiment, when calculating the motor torque command as a function of the acceleration command, the estimated radius of the tires of the vehicle 10 and the estimated total weight of the vehicle 10, the autonomous vehicle controller 34A is further adapted to access, with a machine learning model 52 in communication with a database 54, data related to past occurrences where a motor torque command was calculated, and estimate the motor toque command for a current acceleration command, current estimated radius of the tires of the vehicle 10, current estimated total weight of the vehicle 10 and current operating and environmental conditions based on prior calculated motor torque commands for substantially similar acceleration command, estimated radius of the tires of the vehicle 10, estimated total weight of the vehicle 10 and operating and environmental conditions.

The machine learning model 52 is adapted to predict the motor torque command based on the real-time data. The predicted motor torque command is based on a probabilistic calculation by the machine learning model 52. Various techniques are employed to extract meaningful features from sensor readings and data, including time-series analysis, frequency-domain analysis, and spatial-temporal patterns. The machine learning model 52 may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN).

Thus, the autonomous vehicle controller 34A uses the machine learning model 52 and machine learning techniques to predict a motor torque command based on analyzing the real-time data of the location of the vehicle 10, the operating conditions of the vehicle 10, estimated total vehicle mass and estimated tire size, in light of data received from the database 54 including past occurrences and the locations and operating conditions of the vehicle 10 when estimated total vehicle mass and estimated tire size were identical or similar to the current estimated total vehicle mass and estimated tire size.

Observation of such patterns allows the machine learning model 52 to establish a pattern of behavior, and to predict future behavior based on such patterns. This allows the machine learning model 52 to predict an appropriate motor torque command.

To create the machine learning model 52, first a generic machine learning model is trained with data collected from a plurality of different vehicles located in a region and climate similar to the vehicle 10. A diverse dataset is collected from vehicles equipped with sensors such as GPS, accelerometers, cameras, radar, and LIDAR. The data encompasses various driving scenarios, including urban, highway, and off-road driving. Before feeding the data into machine learning models, preprocessing steps are undertaken to remove noise, handle missing values, and standardize features. An essential step in driving behavior classification is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for probabilistic identification of patterns, including but not limited to Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The generic machine learning model is trained on a labeled dataset and evaluated using various performance metrics such as accuracy, precision, recall, F1-score, and confusion matrix. The hyperparameters of the models are tuned to achieve optimal results. The generic machine learning model is trained on training data and will learn to map input features to the corresponding pattern (actions) probabilities.

The generic machine learning model is uploaded to the autonomous vehicle controller 34A within the vehicle 10. The generic machine learning model provides a basis for creation of the machine learning model 52 for the vehicle 10. The upload of the generic machine learning model may be via a subscription-based service from a third-party provider (remote entity 48) or the subject vehicle 10 manufacturer. The machine learning model 52 is ultimately created by updating the generic machine learning model. Once the generic machine learning model is uploaded, data is collected as the vehicle 10 is used day to day. Use of the vehicle 10 continuously updates the machine learning model 52, tailoring the machine learning model 52 for the vehicle 10. The autonomous vehicle controller 34A may have multiple machine learning models stored therein, each one tailored for a different set of parameters.

For example, when the system 50 detects that a trailer is connected to the vehicle 10, the autonomous vehicle controller 34A, using data from the plurality of sensors 40*a*-40*n*, such as cameras, and object identification algorithms, can analyze images of the connected trailer and identify the specific trailer that is connected to the vehicle 10, and access a machine learning model based on past occurrences of that trailer being connected to the vehicle 10 and calculated motor torque commands during such past instances of that trailer being connected to the vehicle 10. Thus, using the custom machine learning model, the autonomous vehicle controller 34A can accurately predict how to calculate motor torque command that provide desired acceleration as soon as the system 50 identifies current parameters (trailer connected). Similarly, the autonomous vehicle controller 34A can store custom machine learning models for other parameters such as total vehicle mass and tire size.

Thus, the autonomous system controller 34A can stored multiple machine learning models 52 that allow the autonomous system controller 34A to predict, ahead of time, the calculated motor torque command in response to an acceleration command.

In an exemplary embodiment, the autonomous vehicle controller 34A is adapted to receive, from the plurality of onboard sensors 40*a*-40*n*, data related to an actual acceleration of the vehicle 10, compare the actual acceleration of the vehicle 10 to the desired acceleration of the vehicle 10, based on the acceleration command, and adjust the calculated motor torque command based on variation between the actual acceleration of the vehicle 10 and the desired acceleration of the vehicle 10. Thus, the autonomous vehicle controller 34A monitors the actual acceleration of the vehicle 10 and if the calculated motor torque command is not sufficient, or is too much, then the autonomous vehicle controller 34A adjusts the calculated motor torque accordingly. Whenever such adjustments are made, the autonomous vehicle controller 34A updates the machine learning model 52, so the next time, the calculate/predicted motor torque command will be more accurate.

In another exemplary embodiment, the data from the plurality of onboard sensors 40*a*-40*n*, includes feedback from occupants within the vehicle 10. For example, various ones of the plurality of onboard sensors 40*a*-40*n* are associated with an occupant monitoring system that is adapted to capture images of an occupant within the vehicle 10, detect facial expressions and gestures made by such occupant, and detect, with a microphone, verbal reactions made by such an occupant. Using image and speech identification algorithms, the autonomous vehicle controller 34A may determine that an occupant within the vehicle 10 is dissatisfied with the acceleration of the vehicle 10, wherein the autonomous vehicle controller 34A can adjust the calculated motor torque command to either increase or decrease the rate of acceleration of the vehicle 10 to the occupant's preference. For example, the occupant may be uncomfortable with the rate of acceleration of the vehicle 10 due to a large tire size, which makes the vehicle 10 feel less stable to the occupant. If such discomfort is detected by the autonomous vehicle controller 34A, adjustments will be made to the calculated motor torque command and updates will be made to the machine learning model 52 for future estimates.

In an exemplary embodiment, when estimating the radius of the tires 16, 18 of the vehicle 10 based on the real-time data related to the radius of the tires 16, 18 of the vehicle 10, the autonomous vehicle controller 34A is further adapted to one of, when the vehicle 10 is an all-wheel-drive vehicle 10, estimate the radius of each tire 16, 18 of the vehicle 10, and calculate an average tire radius of all the tires 16, 18 of the vehicle 10, when the vehicle 10 is a front-wheel-drive vehicle 10, estimate the radius of each front tire 16 of the vehicle 10, and calculate an average tire radius of all the front tires 16 of the vehicle 10, or, when the vehicle 10 is a rear-wheel-drive vehicle 10, estimate the radius of each rear tire 18 of the vehicle 10, and calculate an average tire radius of all the rear tires 18 of the vehicle 10.

Many methods exist for estimating the radius of vehicle tires using data collected by the plurality of sensors 40*a*-40*n* or by data entered by an operator of the vehicle 10. For example, the autonomous vehicle controller 34A may use data from the plurality of sensors, such as, the height of the vehicle 10 from the ground or distance that the vehicle 10 travels for each revolution of the tires 16, 18 to calculate the radius of the tires 16, 18. Alternatively, the autonomous vehicle controller 34A may access data that has been entered giving the specification of the tires that have been mounted onto the vehicle. However, even having such data, further calculations are likely necessary for accurate determination of the radius of the tires 16, 18. A tire has a static loaded radius or wheel rolling radius. When the tire is not fitted onto a vehicle, the tire remains at a perfectly circular shape. However, as soon as the tire is fitted onto the vehicle 10, and loaded, a flat spot forms where the tire contacts the ground, and thus, the outer radius of the tire is reduced. Therefore, methods using data collected by the plurality of sensors 40*a*-40*n* are utilized to provide accurate estimation of an effective tire radius for use is calculating the motor torque command.

If real-time data related to the radius of the tires 16, 18 of the vehicle 10 is unavailable, the autonomous vehicle controller 34A will either use a pre-determined default value for the radius of the tires 16, 18 of the vehicle 10, or use a previous estimated radius of the tires 16, 18 of the vehicle 10. Thus, if sensor failure or other circumstances makes collection of real-time data unavailable, the autonomous vehicle controller 34A may revert to a default value for tire size based on factory recommended tire size or the size of the tires that were originally installed on the vehicle 10 when the vehicle 10 was manufactured. Alternatively, the autonomous vehicle controller 34A may revert back to the last time the autonomous vehicle controller 34A estimated the tire sizes of the vehicle 10, and use the last recorded estimated tire size.

In an exemplary embodiment, when estimating the total weight of the vehicle 10, including any trailer connected thereto, based on the real-time data related to the mass of the vehicle 10 including any trailer connected thereto, the autonomous vehicle controller 34A is further adapted to, when no trailer is connected to the vehicle 10, estimate the total weight of the vehicle 10 as the estimated weight of the vehicle 10 alone.

Mass of the vehicle 10 may be estimated/calculated by known suitable methods. Vehicle mass is difficult to directly measure using normal sensors. Accurate acquisition of vehicle state parameters is the basis of high-quality motion control of intelligent vehicles. Vehicle mass is an essential parameter in control systems of intelligent vehicles, and the accuracy of its estimation directly affects how control systems perform. For example, the strategies of fuel consumption optimization, active cruise control, and anti-lock braking system control all require the knowledge of vehicle mass. Although nominal values of the vehicle mass, such as curb mass and gross mass, are usually available, the actual value of the vehicle 10 mass varies greatly when the vehicle 10 carries different loads. Therefore, methods exist for accurate estimation of vehicle mass. Some methods of estimating vehicle mass use a fusion of machine learning and vehicle dynamic modeling. In machine learning, a feedforward neural network (FFNN) is used to learn the relationship between vehicle mass and other state parameters, namely longitudinal speed and acceleration, driving or braking torque, and wheel angular speed. In a dynamics-based method, recursive least square (RLS) with forgetting factor based on vehicle dynamic model is used to estimate the vehicle mass. These two methods are fused using fuzzy logic.

Vehicle mass can also be estimated based on frequency domain analysis wherein the amplitude-frequency functions of longitudinal acceleration and wheel angular speed are derived according to a longitudinal vehicle dynamic model, and then uses the least square method to estimate vehicle mass. Recently, machine learning (ML) has been widely applied to intelligent driving, and machine learning methods have been developed to estimate vehicle mass and mass of a trailer connected to a vehicle. Such methods includes collecting the dynamic information of the vehicle under various conditions as the training set, and then training a feedforward neural network to realize simultaneous estimation of vehicle mass and road slope. Other methods include using a feedforward neural network with fully-connected layers to estimate the mass of a trailer connected to the vehicle 10. By learning a large quantity of training data, machine learning methods generally show good accuracy.

In another exemplary embodiment, when estimating the total weight of the vehicle 10, including any trailer connected thereto, based on the real-time data related to the mass of the vehicle 10 including any trailer connected thereto, the autonomous vehicle controller 34A is further adapted to, when a trailer is connected to the vehicle 10, calculate the estimated total weight of the vehicle 10 as a function of the estimated weight of the vehicle 10 alone and a multiplier based on the estimated weight of the vehicle alone and a speed of the vehicle 10.

If real-time data related to the mass of the vehicle 10 including any trailer connected thereto is unavailable, the autonomous vehicle controller 34A will either use a pre-determined default value for the mass of the vehicle 10 including any trailer connected thereto, or use a previous estimated total weight of the vehicle 10 including any trailer connected thereto. Thus, if sensor failure or other circumstances makes collection of real-time data unavailable, the autonomous vehicle controller 34A may revert to a default value for the mass of the vehicle 10 including any trailer connected thereto based on factory data of a base vehicle mass. Alternatively, the autonomous vehicle controller 34A may revert back to the last time the autonomous vehicle controller 34A estimated the mass of the vehicle 10 including any trailer connected thereto, and use the last recorded estimated total weight of the vehicle 10.

In an exemplary embodiment, a method 100 of controlling acceleration within an autonomous vehicle 10, includes, with an autonomous vehicle controller 34A, starting at block 102, receiving an acceleration command based on a desired acceleration of the vehicle 10, moving to block 104, receiving, from a plurality of onboard sensors 40*a*-40*n* within the autonomous vehicle 10, real-time data related to a radius of tires 16, 18 of the vehicle 10, presence of a trailer connected to the vehicle 10, and a mass of the vehicle 10 including any trailer connected thereto, moving to block 106, estimating the radius of the tires 16, 18 of the vehicle 10 based on the real-time data related to the radius of the tires 16, 18 of the vehicle 10, moving to block 108, determining if a trailer is connected to the vehicle 10 based on the real-time data related to the presence of a trailer connected to the vehicle 10, moving to block 110, estimating a total weight of the vehicle 10, including any trailer connected thereto, based on the real-time data related to the mass of the vehicle 10 including any trailer connected thereto, moving to block 112, calculating a motor torque command as a function of the acceleration command, the estimated radius of the tires 16, 18 of the vehicle 10 and the estimated total weight of the vehicle 10, moving to block 114, actuating a propulsion system 20 of the vehicle 10 according to the calculated motor torque command, and, moving to block 116, accelerating the vehicle 10 according to the acceleration command.

In an exemplary embodiment, the calculating a motor torque command as a function of the acceleration command, the estimated radius of the tires 16, 18 of the vehicle 10 and the estimated total weight of the vehicle 10 at block 112, further includes accessing, with a machine learning model 52 in communication with a database 54, data related to past occurrences where a motor torque command was calculated, and estimating the motor toque command for a current acceleration command, current estimated radius of the tires 16, 18 of the vehicle 10, current estimated total weight of the vehicle 10 and current operating and environmental conditions based on prior calculated motor torque commands for substantially similar acceleration command, estimated radius of the tires 16, 18 of the vehicle 10, estimated total weight of the vehicle 10 and operating and environmental conditions.

In another exemplary embodiment, the method 100 further includes, moving to block 118, receiving, with the autonomous vehicle controller 34A, from the plurality of onboard sensors 40*a*-40*n*, data related to an actual acceleration of the vehicle 10, and moving to block 120, comparing the actual acceleration of the vehicle 10 to the desired acceleration of the vehicle 10. If at block 120, the actual acceleration of the vehicle 10 matches the desired acceleration of the vehicle 10 (based on the acceleration command), then, the method reverts back to block 102. If, at block 120, the actual acceleration of the vehicle does not match, within a pre-determined error threshold, the desired acceleration of the vehicle 10, then, the method 100 moves to block 122, and includes adjusting the calculated motor torque command based on variation between the actual acceleration of the vehicle 10 and the desired acceleration of the vehicle 10, wherein the method reverts back to block 112, wherein the adjusted motor torque command is sent to the propulsion system 20 at block 114.

In an exemplary embodiment, when adjustments are made to the calculated motor torque command at block 122, the method 100 includes, moving from block 122 to block 124, updating the machine learning model 52 based on the adjustments to the calculated motor torque command.

In another exemplary embodiment, the estimating the radius of the tires 16, 18 of the vehicle 10 based on the real-time data related to the radius of the tires 16, 18 of the vehicle 10 at block 106 includes, when the vehicle 10 is an all-wheel-drive vehicle, estimating the radius of each tire 16, 18 of the vehicle 10, and calculating an average tire radius of all the tires 16, 18 of the vehicle 10.

In another exemplary embodiment, the estimating the radius of the tires 16, 18 of the vehicle 10 based on the real-time data related to the radius of the tires 16, 18 of the vehicle 10 at block 106 includes, when the vehicle 10 is a front-wheel-drive vehicle, estimating the radius of each front tire 16 of the vehicle 10, and calculating an average tire radius of all the front tires 16 of the vehicle 10.

In another exemplary embodiment, the estimating the radius of the tires 16, 18 of the vehicle 10 based on the real-time data related to the radius of the tires 16, 18 of the vehicle 10 at block 106 includes, when the vehicle 10 is a rear-wheel-drive vehicle, estimating the radius of each rear tire 18 of the vehicle 10, and calculating an average tire radius of all the rear tires 18 of the vehicle 10

In another exemplary embodiment, the estimating the radius of the tires 16, 18 of the vehicle 10 based on the real-time data related to the radius of the tires 16, 18 of the vehicle 10 at block 106 includes, when real-time data related to the radius of the tires 16, 18 of the vehicle 10 is unavailable, one of using a pre-determined default value for the radius of the tires 16, 18 of the vehicle 10, or using a previous estimated radius of the tires 16, 18 of the vehicle 10.

In another exemplary embodiment, the estimating the total weight of the vehicle 10, including any trailer connected thereto, based on the real-time data related to the mass of the vehicle 10 including any trailer connected thereto at block 110 further includes, when no trailer is connected to the vehicle 10, estimating the total weight of the vehicle 10 as the estimated weight of the vehicle 10 alone.

In another exemplary embodiment, the estimating the total weight of the vehicle 10, including any trailer connected thereto, based on the real-time data related to the mass of the vehicle 10 including any trailer connected thereto at block 110 further includes, when a trailer is connected to the vehicle 10, calculating the estimated total weight of the vehicle 10 as a function of the estimated weight of the vehicle 10 alone and a multiplier based on the estimated weight of the vehicle 10 alone and a speed of the vehicle 10.

In another exemplary embodiment, the estimating the total weight of the vehicle 10, including any trailer connected thereto, based on the real-time data related to the mass of the vehicle 10 including any trailer connected thereto at block 110 further includes, when real-time data related to the mass of the vehicle 10 including any trailer connected thereto is unavailable, one of using a pre-determined default value for the total weight, or using a previous estimated total weight.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of controlling acceleration within an autonomous vehicle, comprising, with an autonomous vehicle controller:

receiving an acceleration command based on a desired acceleration of the vehicle;

receiving, from a plurality of onboard sensors within the autonomous vehicle, real-time data related to a radius of tires of the vehicle, presence of a trailer connected to the vehicle, and a mass of the vehicle including any trailer connected thereto;

estimating the radius of the tires of the vehicle based on the real-time data related to the radius of the tires of the vehicle, including, when the vehicle is an all-wheel-drive vehicle, estimating the radius of each tire of the vehicle, and calculating an average tire radius of all the tires of the vehicle;

determining if the trailer is connected to the vehicle based on the real-time data related to the presence of the trailer connected to the vehicle;

estimating a total weight of the vehicle, including any trailer connected thereto, based on the real-time data related to the mass of the vehicle including any trailer connected thereto;

calculating a motor torque command as a function of the acceleration command, the estimated radius of the tires of the vehicle and the estimated total weight of the vehicle;

actuating a propulsion system of the vehicle according to the calculated motor torque command; and accelerating the vehicle according to the acceleration command.

2. The method of claim 1, wherein the calculating the motor torque command as a function of the acceleration command, the estimated radius of the tires of the vehicle and the estimated total weight of the vehicle further includes:

accessing, with a machine learning model in communication with a database, data related to past occurrences where a motor torque command was calculated; and estimating the motor torque command for a current acceleration command, current estimated radius of the tires of the vehicle, current estimated total weight of the vehicle and current operating and environmental conditions based on prior calculated motor torque commands for substantially similar acceleration command, estimated radius of the tires of the vehicle, estimated total weight of the vehicle and operating and environmental conditions.

3. The method of claim 2 further including:

receiving, with the autonomous vehicle controller, from the plurality of onboard sensors, data related to an actual acceleration of the vehicle;

comparing the actual acceleration of the vehicle to the desired acceleration of the vehicle; and adjusting the calculated motor torque command based on variation between the actual acceleration of the vehicle and the desired acceleration of the vehicle.

4. The method of claim 3 further including updating the machine learning model based on adjustments made to the calculated motor torque command.

5. The method of claim 1, wherein the estimating the radius of the tires of the vehicle based on the real-time data related to the radius of the tires of the vehicle includes, when the vehicle is a front-wheel-drive vehicle:

estimating the radius of each front tire of the vehicle; and calculating an average tire radius of all the front tires of the vehicle.

6. The method of claim 1, wherein the estimating the radius of the tires of the vehicle based on the real-time data related to the radius of the tires of the vehicle includes, when the vehicle is a rear-wheel-drive vehicle:

estimating the radius of each rear tire of the vehicle; and calculating an average tire radius of all the rear tires of the vehicle.

7. The method of claim 1, wherein the estimating the radius of the tires of the vehicle based on the real-time data related to the radius of the tires of the vehicle includes, when real-time data related to the radius of the tires of the vehicle is unavailable, one of:

using a pre-determined default value for the radius of the tires of the vehicle.

8. The method of claim 1, wherein the estimating the total weight of the vehicle, including any trailer connected thereto, based on the real-time data related to the mass of the vehicle including any trailer connected thereto further includes, when no trailer is connected to the vehicle, estimating the total weight of the vehicle as the estimated weight of the vehicle alone.

9. The method of claim 1, wherein the estimating the total weight of the vehicle, including any trailer connected thereto, based on the real-time data related to the mass of the vehicle including any trailer connected thereto further includes, when the trailer is connected to the vehicle, calculating the estimated total weight of the vehicle as a function of the estimated weight of the vehicle alone and a multiplier based on the estimated weight of the vehicle alone and a speed of the vehicle.

10. The method of claim 1, wherein the estimating the total weight of the vehicle, including any trailer connected thereto, based on the real-time data related to the mass of the vehicle including any trailer connected thereto further includes, when real-time data related to the mass of the vehicle including any trailer connected thereto is unavailable, one of:

using a pre-determined default value for the total weight; or using a previous estimated total weight.

11. The method of claim 1, wherein the estimating the radius of the tires of the vehicle based on the real-time data related to the radius of the tires of the vehicle includes, when real-time data related to the radius of the tires of the vehicle is unavailable, using a previous estimated radius of the tires of the vehicle.

12. A system for controlling acceleration within an autonomous vehicle, comprising an autonomous vehicle controller configured to:

receive an acceleration command based on a desired acceleration of the vehicle;

receive, from a plurality of onboard sensors within the autonomous vehicle, real-time data related to a radius of tires of the vehicle, presence of a trailer connected to the vehicle, and a mass of the vehicle including any trailer connected thereto;

estimate the radius of the tires of the vehicle based on the real-time data related to the radius of the tires of the vehicle, including, when the vehicle is an all-wheel-drive vehicle, estimate the radius of each tire of the vehicle, and calculate an average tire radius of all the tires of the vehicle;

determine if the trailer is connected to the vehicle based on the real-time data related to the presence of the trailer connected to the vehicle;

estimate a total weight of the vehicle, including any trailer connected thereto, based on the real-time data related to the mass of the vehicle including any trailer connected thereto;

calculate a motor torque command as a function of the acceleration command, the estimated radius of the tires of the vehicle and the estimated total weight of the vehicle;

actuate a propulsion system of the vehicle according to the calculated motor torque command; and accelerate the vehicle according to the acceleration command.

13. The system of claim 12, wherein, when calculating the motor torque command as a function of the acceleration command, the estimated radius of the tires of the vehicle and the estimated total weight of the vehicle, the autonomous vehicle controller is further configured to:

access, with a machine learning model in communication with a database, data related to past occurrences where a motor torque command was calculated; and estimate the motor torque command for a current acceleration command, current estimated radius of the tires of the vehicle, current estimated total weight of the vehicle and current operating and environmental conditions based on prior calculated motor torque commands for substantially similar acceleration command, estimated radius of the tires of the vehicle, estimated total weight of the vehicle and operating and environmental conditions.

14. The system of claim 13, wherein the autonomous vehicle controller is further configured to:

receive, from the plurality of onboard sensors, data related to an actual acceleration of the vehicle;

compare the actual acceleration of the vehicle to the desired acceleration of the vehicle; and adjust the calculated motor torque command based on variation between the actual acceleration of the vehicle and the desired acceleration of the vehicle.

15. The system of claim 14 wherein the autonomous vehicle controller is further configured to update the machine learning model based on adjustments made to the calculated motor torque command.

16. The system of claim 12, wherein, when estimating the radius of the tires of the vehicle based on the real-time data related to the radius of the tires of the vehicle, the autonomous vehicle controller is further configured to:

when the vehicle is a front-wheel-drive vehicle, estimate the radius of each front tire of the vehicle, and calculate an average tire radius of all the front tires of the vehicle;

when the vehicle is a rear-wheel-drive vehicle, estimate the radius of each rear tire of the vehicle, and calculate an average tire radius of all the rear tires of the vehicle; and when real-time data related to the radius of the tires of the vehicle is unavailable, one of use a pre-determined default value for the radius of the tires of the vehicle, or use a previous estimated radius of the tires of the vehicle.

17. The system of claim 12, wherein, when estimating the total weight of the vehicle, including any trailer connected thereto, based on the real-time data related to the mass of the vehicle including any trailer connected thereto, the autonomous vehicle controller is further configured to, when no trailer is connected to the vehicle, estimate the total weight of the vehicle as the estimated weight of the vehicle alone.

18. The system of claim 12, wherein, when estimating the total weight of the vehicle, including any trailer connected thereto, based on the real-time data related to the mass of the vehicle including any trailer connected thereto, the autonomous vehicle controller is further configured to, when the trailer is connected to the vehicle, calculate the estimated total weight of the vehicle as a function of the estimated weight of the vehicle alone and a multiplier based on the estimated weight of the vehicle alone and a speed of the vehicle.

19. The system of claim 12, wherein, when estimating the total weight of the vehicle, including any trailer connected thereto, based on the real-time data related to the mass of the vehicle including any trailer connected thereto, the autonomous vehicle controller is further configured to, when real-time data related to the mass of the vehicle including any trailer connected thereto is unavailable, one of use a pre-determined default value for the total weight, or use a previous estimated total weight.

20. A vehicle having a system for controlling acceleration within an autonomous vehicle, the system including an autonomous vehicle controller configured to:

receive an acceleration command based on a desired acceleration of the vehicle;

receive, from a plurality of onboard sensors within the autonomous vehicle, real-time data related to a radius of tires of the vehicle, presence of a trailer connected to the vehicle, and a mass of the vehicle including any trailer connected thereto;

estimate the radius of the tires of the vehicle based on the real-time data related to the radius of the tires of the vehicle, wherein the autonomous vehicle controller is adapted to one of:

when the vehicle is an all-wheel-drive vehicle, estimate the radius of each tire of the vehicle, and calculate an average tire radius of all the tires of the vehicle;

when the vehicle is a front-wheel-drive vehicle, estimate the radius of each front tire of the vehicle, and calculate an average tire radius of all the front tires of the vehicle;

when the vehicle is a rear-wheel-drive vehicle, estimate the radius of each rear tire of the vehicle, and calculate an average tire radius of all the rear tires of the vehicle; and when real-time data related to the radius of the tires of the vehicle is unavailable, one of use a pre-determined default value for the radius of the tires of the vehicle, or use a previous estimated radius of the tires of the vehicle;

determine if the trailer is connected to the vehicle based on the real-time data related to the presence of the trailer connected to the vehicle;

estimate a total weight of the vehicle, including any trailer connected thereto, based on the real-time data related to the mass of the vehicle including any trailer connected thereto, wherein the autonomous vehicle controller is adapted to one of:

when no trailer is connected to the vehicle, estimate the total weight of the vehicle as the estimated weight of the vehicle alone;

when the trailer is connected to the vehicle, calculate the estimated total weight of the vehicle as a function of the estimated weight of the vehicle alone and a multiplier based on the estimated weight of the vehicle alone and a speed of the vehicle; and when real-time data related to the mass of the vehicle including any trailer connected thereto is unavailable, one of use a pre-determined default value for the total weight, or use a previous estimated total weight;

access, with a machine learning model in communication with a database, data related to past occurrences where a motor torque command was calculated;

calculate the motor torque command for a current acceleration command, current estimated radius of the tires of the vehicle, current estimated total weight of the vehicle and current operating and environmental conditions based on prior calculated motor torque commands for substantially similar acceleration command, estimated radius of the tires of the vehicle, estimated total weight of the vehicle and operating and environmental conditions;

actuate a propulsion system of the vehicle according to the calculated motor torque command;

accelerate the vehicle according to the acceleration command;

receive, from the plurality of onboard sensors, data related to an actual acceleration of the vehicle;

compare the actual acceleration of the vehicle to the desired acceleration of the vehicle;

adjust the calculated motor torque command based on variation between the actual acceleration of the vehicle and the desired acceleration of the vehicle; and update the machine learning model based on adjustments made to the calculated motor torque command.

* * * * *